United States Patent [19]

Koppelman

[11] 3,855,071

[45] Dec. 17, 1974

[54] CARBONIZATION APPARATUS HAVING LOUVERS ON INTERNAL DUCT

[75] Inventor: Edward Koppelman, Encino, Calif.

[73] Assignee: Continental Energy Corporation

[22] Filed: Dec. 8, 1971

[21] Appl. No.: 205,783

[52] U.S. Cl............... 202/121, 202/127, 202/225, 201/34, 252/421
[51] Int. Cl............................................. C01k 3/00
[58] Field of Search .......... 202/121, 120, 221, 225, 202/253, 251, 262, 127, 126, 124; 201/34, 36, 27; 23/288 G, 277; 252/421, 445

[56] References Cited
UNITED STATES PATENTS

| | | |
|---|---|---|
| 3,433,713 | 3/1969 | Reid..................................... 201/34 |
| 1,268,628 | 6/1918 | Rusby et al. ..................... 202/225 X |
| 1,358,662 | 11/1920 | Wallace .......................... 202/225 X |
| 2,430,056 | 11/1947 | Kent .................................... 202/120 |
| 2,967,133 | 1/1961 | Brandberg ....................... 201/34 X |

Primary Examiner—Norman Yudkoff
Assistant Examiner—David Edwards
Attorney, Agent, or Firm—Harness, Dickey & Pierce

[57] ABSTRACT

An apparatus and method for processing vegetable and other carbonaceous matter to effect a conversion thereof into an activated carbonaceous char by heating the carbonaceous material in the substantial absence of oxygen and removing the gaseous constituents as they are evolved in a manner to prevent any appreciable adsorption thereof on the carbonized product.

4 Claims, 7 Drawing Figures

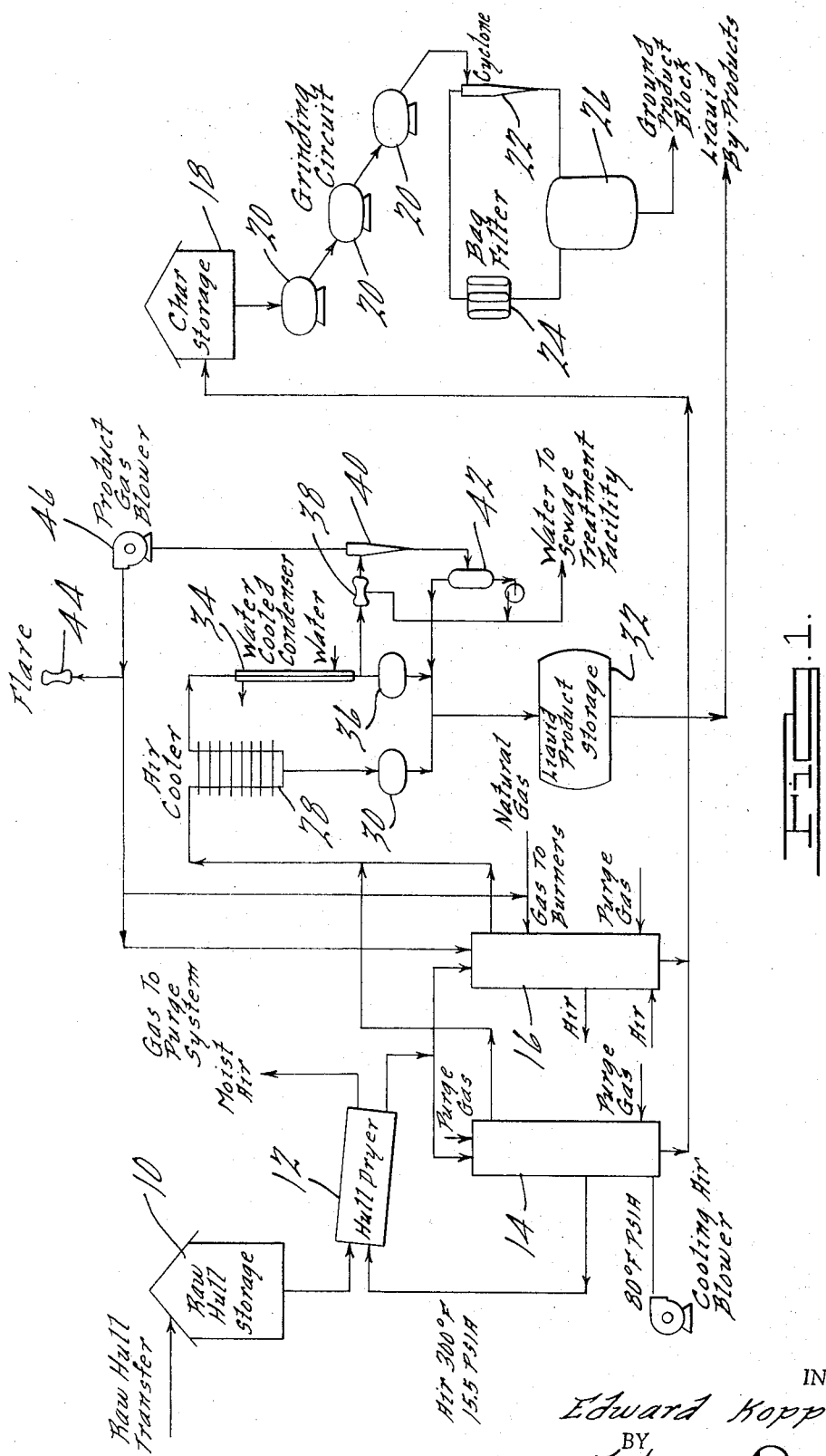

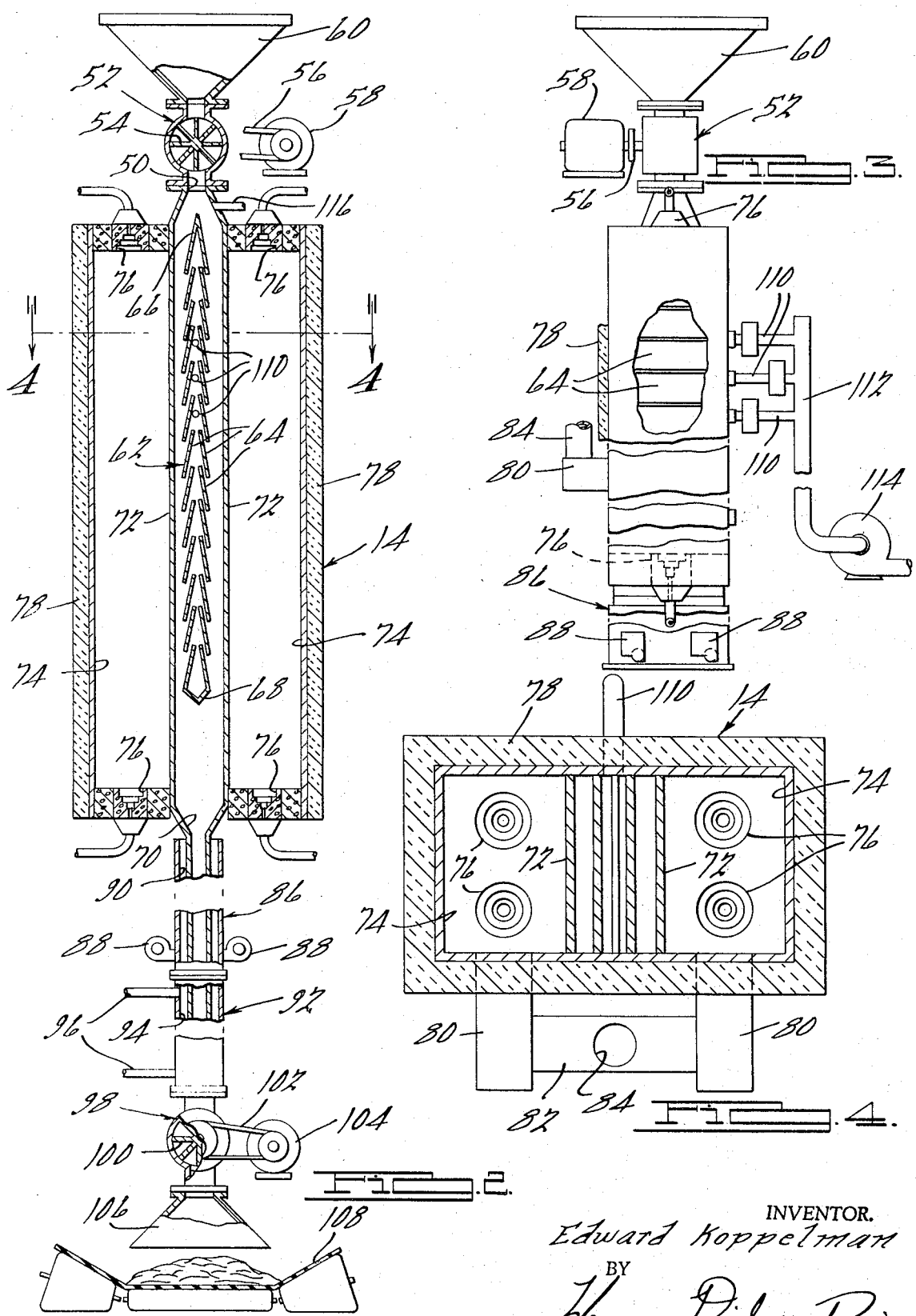

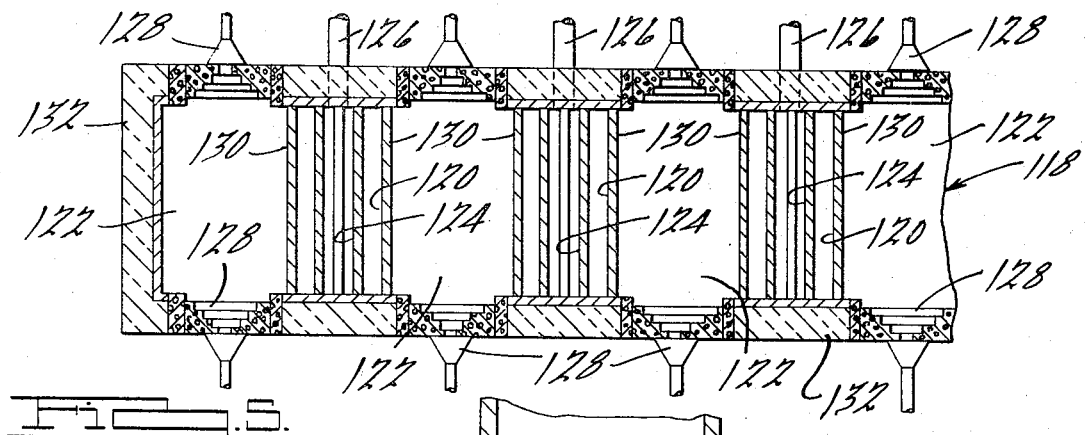
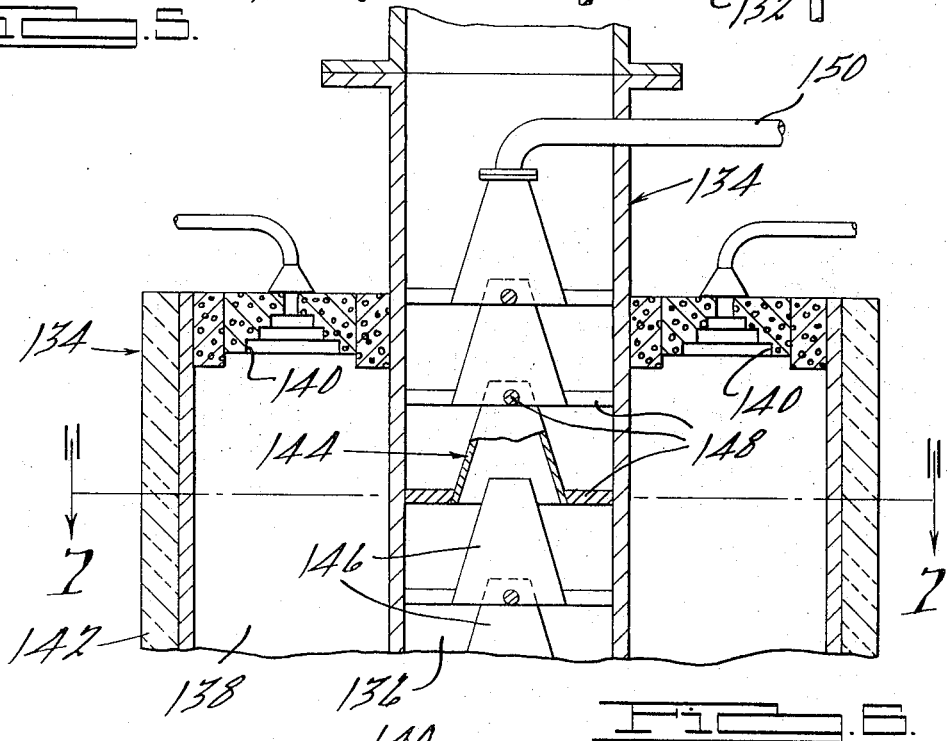
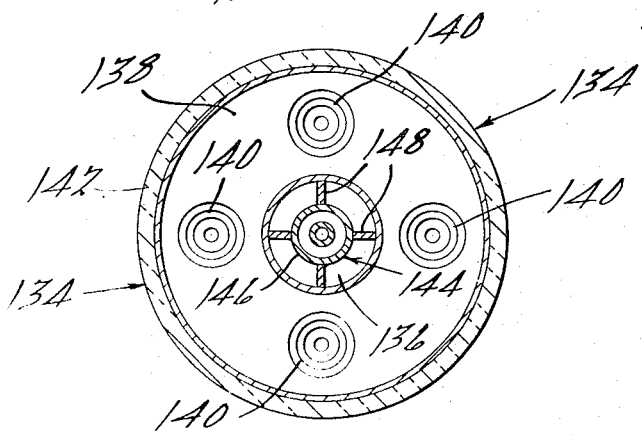

CARBONIZATION APPARATUS HAVING LOUVERS ON INTERNAL DUCT

BACKGROUND OF THE INVENTION

A variety of processing techniques and materials have heretofore been used or proposed for converting various vegetable or other carbonaceous matter to an activated carbon or activated characal product suitable for use in various industrial and specialized processes in view of their high adsorptive power. Conventionally, vegetable matter or plant life including derivatives thereof such as wood, peat, lignite, nutshells, corn husks, bark and the like, as well as other carbonaceous substances, such as bones, are heated in accordance with known techniques and in the substantial absence of air to an elevated temperature to effect a destructive distillation or pyrolysis of the carbonaceous material to produce a carbon product accompanied by the liberation of vapors and other gaseous by-products. The resultant carbon product is recovered and thereafter is subjected to an ancillary activation step which usually involves a heating of the carbonaceous material to a high temperature ranging from about 800°C. to about 900°C., while simultaneously treating it with steam or other gases, such as carbon dioxide, to produce a porous structure. Depending on the particular type of starting material, the carbon content of the resultant activated char may range from as low as about 10 percent by weight, as in the case of bone charcoal, to as high as about 98 percent by weight for activated carbons derived from wood. In order to still further increase the adsorptive activity of such activated carbonaceous materials, various hygroscopic substances such as zinc chloride and phosphoric acid or sodium sulfate have been added to the carbonaceous matter prior to the destructive distillation step or prior to the subsequent activation treatment.

In any event, a continuing problem associated with prior art apparatuses and processing techniques has been the need for subjecting the carbonized product to one or a multiple of successive activation treatments to impart an adsorptive capacity thereto of a magnitude to render the material suitable for adsorbing gases, vapors and colloidal solids. The low density of such carbonized substances, which may range in densities from as low as about 0.08 up to nearly 0.5, , as well as the fragile nature thereof, causes a great deal of difficulty in handling of the material during such activation treatments and also results in a substantial loss of material, which detracts from the efficiency and economy of the overall process. In many instances, such known activation treatments are effective to attain only a fraction of the total adsorptive capacity of the material.

The foregoing problems and disadvantages of prior art techniques are overcome by the improved apparatus and method comprising the present invention, whereby any one of a variety of carbonaceous materials can be processed in continuous as opposed to a batch-type operation to effect a conversion thereof into an activated carbon product in one step without necessitating any subsequent activation treatments of the resultant carbonized product discharged from the reactor. It has been further found that activated carbonized products produced from at least some of the vegetable feed matter in accordance with the practice of this invention, upon pulverization thereof, provide excellent performance as filler materials in various elastomeric and resinous compositions which formerly could be attainable only by using various furnace and thermal blacks of comparatively higer cost.

SUMMARY OF THE INVENTION

The benefits and advantages of the present invention are achieved by an improved apparatus comprising a reactor having a chamber formed with an inlet through which the vegetable or other carbonaceous feed material is introduced at a controlled rate and an outlet opening through which the resultant carbonized char is discharged. The reaction chamber is provided with means for effecting a heating of the chamber and the material therein to produce a progressive destructive distillation and carbonization of the feed material during the course of its travel from the inlet to the outlet of the chamber. The heating is carried out in the substantial absence of air and the reactor is further provided with venting means preferably in the form of a foraminous duct extending centrally of and for at least a portion of the length of the chamber to effect a continuous withdrawal of the vapors and other gaseous products evolved during the carbonization process. The vapors and other gaseous decomposition products evolved are withdrawn in a manner so as to prevent any appreciable deposition thereof on the active sites created in the carbonaceous material undergoing pyrolysis, whereby the resultant carbonized product discharged from the reactor is in a highly adsorptive condition dispensing with the heretofore time consuming and costly practices of subjecting such carbon products to further postactivation treatments. The resultant carbonized product, prior to being discharged from the reactor, is cooled to reduce the temperature thereof to a level below that at which any combustion thereof will occur upon contact with and exposure to the air.

In its method aspects, the present invention is directed to a process wherein a heating of vegetable or other carbonaceous materials is effected in the substantial absence of oxygen to a temperature at which a carbonization thereof occurs accompanied by the evolution of gaseous by-products and the volatilization of various liquid substances in the feed material which are withdrawn in a manner to provide for minimum contact with the carbonized material, thereby preventing any appreciable deposition and/or adsorption of such gaseous substances on the active sites created in the carbonaceous product.

In its product aspects, the present invention is directed to a reinforcing carbon/silica filler material for use in elastomeric formulations derived from the activated char produced in the reactor which has been subjected to a further pulverization operation.

Still further advantages and benefits of the process and apparatus comprising the present invention will become apparent upon a reading of the description of the preferred embodiments taken in conjunction with the accompanying drawings.

BRIEF DESCRIPTION OF THE DRAWINGS.

FIG. 1 is a schematic flow diagram of a process for converting vegetable matter into an activated char and effecting a recovery and at least partial utilization of some of the gaseous products evolved during the pyrolysis step;

FIG. 2 is a fragmentary vertical elevational view, partly in section, of a reactor embodied in the process schematically illustrated in FIG. 1 in which the pyrolysis reaction is carried out;

FIG. 3 is a fragmentary side elevational view, partly in section, of the reactor shown in FIG. 2;

FIG. 4 is a transverse sectional view through the reactor shown in FIG. 2 as viewed substantially along the line 4—4 thereof;

FIG. 5 is a fragmentary transverse sectional view similar to FIG. 4, but illustrating a multiple chamber reactor in accordance with an alternative embodiment of this invention;

FIG. 6 is a fragmentary vertical sectional view of an alternative satisfactory reactor construction; and FIG. 7 is a transverse view through the reactor shown in FIG. 6 and taken substantially along the line 7—7 thereof.

DESCRIPTION OF THE PREFERRRED EMBODIMENTS

It will be understood that the composition of the various raw feed materials as well as the resultant activated carbon product as herein described and as set forth in the subjoined claims are expressed in terms of percentages by weight unless expressly indicated to the contrary.

Referring now in detail to the drawings, and as may be best seen in the schematic flow sheet comprising FIG. 1, a vegetable or other carbonaceous feed material, such as the hulls and straw derived from rice, are transferred to a storage chamber, indicated at 10, from which they are removed as required and transferred to a rotary kiln dryer 12 for a removal of the predominant portion of moisture therefrom. The subjection of the vegetable feed material to a preliminary drying step constitutes a preferred practice in that the volume of vapors evolved during the subsequent pyrolysis reaction is reduced in direct proportion to the amount of moisture removed. The amount of moisture present can be considerable, particularly when such vegetable matter has been stored in open bins subject to exposure to the elements. The preliminary drying step also enchances the efficiency of the process by enabling the utilization of some of the waste heat from the reactor, while concurrently reducing the net quantity of heat required during the pyrolysis reaction.

The feed material such as the rice hulls is transferred from the dry 12 to the inlet end of either or both reactors 14, 16 in which they are heated to an elevated temperature in the substantial absence of air or other oxygen containing gas in a manner subsequently to be described in greater detail. Avoidance of the entry of air into the inlet and outlet ends of the reactors is achieved by the introduction of a pressurized purge gas at each of these locations. The purge gas, which may comprise any gaseous substance substantially devoid of free oxygen and conveniently may comprise the non-condensible portions of the gas recycled from the liquid recovery section, further serves to prevent any appreciable escape of the vapors and gaseous products formed during the pyrolysis reaction and also facilitates an entrainment and sweeping of such vapors and gaseous substances from the reactor.

At the completion of the pyrolysis reaction, the carbonized and activated char is discharged from the outlet end of the reactors 14 and/or 16 and is transferred to a char storage unit 18, from which it can be directly packaged and shipped as desired or, alternatively, can be subjected to a multiple grinding operation in grinders 20 to effect a reduction in size to within a desired range. The grinding system further includes a cyclone separator 22 and a filter 24 for recovering the fines. The resultant comminuted activated carbon product is collected in a collector 26 prior to packaging and shipment.

In the liquid recovery section of the process illustrated in FIG. 1, the vapors and other gaseous products evolved during the pyrolysis reaction in reactors 14 and/or 16 are consolidated and are transferred to an air coller 28 to effect a preliminary condensation and extraction of the less volatile constituents and the resultant liquid condensate is transferred to a collector 30 in which further cooling is effected and thereafter the liquid fraction is transferred to a product storage tank 32. The more volatile constituents remaining in the gaseous phase upon exiting from the air cooler 28 are transferred to a water-cooled condenser 34 in which a second condensation thereof occurs and the resultant condensed liquid is recovered in a collector 36 from which it is transferred to liquid product storage tank 32.

The non-condensed vapors and gases remaining after passing through the water-cooled condenser 34 are transferred to a water scrubber 38 including a separator 40. The liquid fraction is removed from the bottom of the separator 40 and is transferred to a collector 42 in which a phase separation occurs and the resultant organic layer is withdrawn and transferred to the liquid product storage tank 32. The aqueous phase in turn is in part recycled to the scrubber, while the remainder after suitable treatment, is discharged to waste.

The remaining gaseous constituents passing through the separator 40 comprise product gas which, if produced in an excess, can be burned at a flare 44, or preferably, after compression by a suitable blower 46, is utilized as the purge gas for the reactors 14, 16, as well as a gaseous fuel or supplemental gaseous fuel for firing the reactors.

The organic liquids recovered in the liquid product storage tank 32, which comprises a crude pyrolysate composed of a mixture of naturally occurring organic substances, as well as the thermal degradation products thereof, can be further refined to effect a separation and/or recovery of specific organic materials including neutral oils, cresylic acids, carboxylic acids, pyridiene bases, etc. Such organic liquids or refined organic by-products also are of commerical value and serve to further offset the processing costs and contribute to the overall efficiency of the process of this invention.

It will be apparent from the process schematically illustrated in FIG. 1, that an integrated processing of various types of vegetable and carbonaceous matter can be accomplished in a manner to produce an activated carbonaceous char in addition to the recovery of other valuable by-products evolved during the pyrolysis reaction. In the specific arrangement as described and shown, two reactors 14, 16 are incorporated in the process enabling only one or both units to be placed on stream simultaneously as may be desired to provide the requisite processing capacity. Each of the reactors employed in the process are substantially identical and only one need be described in detail for a complete understanding of the apparatus aspects of the present invention.

Referring now in detail to FIGS. 2–4, a reactor, such as the reactor 14, is shown which comprises a centrally extending reaction chamber 48 which is of a substantially rectangular cross section and is preferably made of a suitable heat resistant metal, such as stainless steel. The reaction chamber, as best seen in FIG. 2, is formed with an inlet opening 50 at the upper end thereof, to the flanged upper end of which a star or paddle wheel feeder mechanism 52 is securely fastened. The feeder mechanism incorporates a paddle wheel 54 which is rotatably supported within the housing of the feeder mechanism and is rotatably driven through a belt 56 drivingly coupled to a variable speed motor 58. In accordance with this arrangement, the vegetable or carbonaceous feed material loaded into a hopper 60 flows downwardly through the action of gravity into the feeder mechanism and thereafter is discharged into the inlet opening of the reaction chamber at a controlled feed rate in accordance with the speed of rotation of the paddle wheel 54.

A foraminous duct 62 comprising a plurality of transversely extending louvers 64 extends centrally of the reaction chamber 48 and for a major portion of the vertical height thereof. The angularity of the louvers 64 and the gaps or spacing between adjacent ones is controlled so that the feed material moves downwardly without becoming lodged or entrapped within the openings along the foraminous duct, which remains open to extract all of the vapors and other gaseous products evolved during the pyrolysis reaction. As will be noted in FIG. 2, the uppermost pair of louvers, indicated at 66, are arranged in the form of an inverted V so as to divide the feed material passing downwardly through the inlet opening into two substantially equal side streams. Similarly, the lowermost pair of louvers, indicated at 68, are closed at their lower ends to avoid any backup of carbonized material into the lower end of the foraminous duct. The configuration of the lower pair of louvers 68 also facilitates a confluence of the two divided streams of material prior to their discharge from the reaction chamber through an outlet opening 70 formed in the lower end thereof.

The major side walls 72 of the reaction chamber are disposed in heated relationship with combustion chambers 74 provide with gas-fired radiant heaters 76 in the upper and lower sections thereof. The peripheral surfaces of the combustion chamber 74 are insulated by a layer 78 of a suitable refractory insulating material. The combustion gases emitted from the radiant heaters 76 are removed from the combustion chambers through ducts 80 which are connected, as best seen in FIG. 4, to a cross duct 82 having a chimney 84 in communication with the center thereof. These combustion gases as previously indicated can be ducted to the dryer 12 (FIG. 1) for preheating and drying the carbonaceous feed material prior to its entry into the reactor.

The carbonized material discharged through the discharge or outlet opening 70 in the combustion chamber is subjected to a preliminary cooling step in an air cooler section 86. As best seen in FIG. 2, a pair of blowers 88 are adapted to cause a countercurrent flow of cooling air upwardly through a baffle chamber 90 to effect a reduction in the temperature of the carbonized char.

The carbonized material passing downwardly through the air cooler section 86 is discharged from the lower end thereof and enters a water-cooled section 92 in which a further cooling thereof is effected. The cooling section 92 is formed with a chamber 94 which is connected by means of pipes 96 for circulating cooling water therethrough in a countercurrent manner.

The air cooled and water cooled carbonized product is discharged from the oulet end of the water-cooled section into a feeder mechanism 98 of the same general type as the feeder mechanism 52. The feeder mechanism 98 is also provided with a star or paddle wheel 100 which is drivingly coupled by means of a belt 102 to a variable speed motor 104 for effecting a rotation thereof at a controlled rate, thereby controlling the rate of discharge of the cooled activated carbonaceous product out through a discharge chute 106 onto a flexible conveyor 108 for transfer to product storage.

As best seen in FIGS. 2 and 3, the interior of the foraminous duct 62 is connected to a series of ducts 110 which are connected to a manifold 112 having its end connected to the suction side of a gas blower 114. The gas blower 114 is operated in a manner so as to prevent any build-up pressure within the foraminous duct in excess of that present in the reaction chamber. The continuous application of a slight suction to the foraminous duct at several locations therealong through the ducts 110 is effective to remove the gaseous decomposition products, as well as the vapors generated during the pyrolysis reaction. A sweeping of the vapors into the interior of the foraminous duct is also facilitated by the continuous introduction of a purge gas by means of an inlet pipe 116 located adjacent to the inlet opening 50 of the reactor chamber. The introduction of the inert purge gas at this location prevents any appreciable accumulation of vapors in the upper section of the reaction chamber and, moreover, serves to continuously sweep the vapors as they are formed inwardly toward the foraminous duct from which they are removed through the manifold system. The introduction of purge gas at the upper section of the reaction chamber also serves to sweep any entrained air entrapped within the particles of feed material and to immediately sweep such air into the foraminous duct so as to prevent any combustion of the feed material.

In operation, the feed material which is in a particulated substantially free-flowing state is introduced into the hopper 60 from which it is progressively fed through the feeder mechanism 52 into the upper end of the reaction chamber. The paddle wheel 54 of the feeder mechanism 52 is disposed in close clearance relationship relative to the encircling housing serving as a gas and vapor tight seal to minimize escape of any gases from the interior of the reactor, as well as to prevent any inward leakage of air into the reaction chamber. The rotation of the feeder mechanism 52 is controlled so as to maintain the reaction chamber substantially completely filled with the carbonaceous feed material. In this regard, the rate of operation of the feeder mechanism 52 is coordinated with the operation of the feeder mechanism 98 in order to allow for a volumetric shrinkage of the carbonaceous matter during the course of the pyrolysis reaction. The discharge feeder mechanism 98 is operated to assure that the entire reaction chamber and cooling sections are maintained full of feed material which continuously moves downwardly by the action of gravity.

The rate of travel of the vertical column of feed material is controlled so as to assure sufficient residence time of the material within the hot zone of the reaction chamber to effect a substantially complete pyrolysis reaction thereof, followed by sufficient cooling in the air and water cooled sections such that the discharged product is of a temperature below that at which any appreciable oxidation occurs upon its discharge onto the conveyor 108 and in contact with the atmopshere. The cooling temperature will vary depending upon the specific feed material being processed. Generally a temperature of about 50°C. is satisfactory for most materials.

The feed material, upon entering through the inlet opening 50 in the reaction chamber, is divided into two relatively thin laminar columns disposed with one surface against the major side wall 72 of the reaction chamber which is heated to an elevated temperature so as to effect a heating of the carbonaceous matter to a temperature of at least about 300°C., and preferably from a temperature from about 500°c. to about 1,000°C. The heating of the feed material occurs first at a location immediately adjacent to the walls 72 and the resultant vapors generated pass inwardly through the cooler portions of feed material and are eventually withdrawn through the foraminous duct 62. As the columns of material move downwardly, a progressive heating of the feed material occurs, whereby eventually the material disposed adjacent to the foraminous duct also becomes heated to the pyrolysis reaction temperature, effecting a liberation of vapors and other gaseous products and a conversion thereof into an activated char. The pyrolysis reaction continues as the material passes downwardly and finally the substantially completely carbonized char is discharged through the outlet opening 70 of the reaction chamber into the inlet end of the air cooler section 86. The activated char, upon traveling through the air and water cooled sections, is cooled from the pyrolysis reaction temperature to a temperature level at which it can be discharged into contact with the surrounding atmosphere without adverse effects.

It will be noted in accordance with the foregoing operational description that the gaseous products and other thermal decomposition gases produced during the pyrolysis reaction are almost immediately removed from contact with the carbonized product, thereby preventing any appreciable deposition or adsorption thereof on the activated sites created. In accordance with this construction and operation, the carbonaceous product discharged from the reactor is substantially deviod of any adsorbed substances, whereby the material is of a higher adsorptive capacity and can be used in that form or after a preliminary grinding without requiring any ancillary activation treatments.

An alternative satisfactory multiple duct reactor 118 is shown in FIG. 5 which is similar to the reactor 14 as shown in FIGS. 2-4 but incorporates a plurality of reaction chambers 120 disposed in vertically spaced substantially parallel relationship and separated by intervening combustion chamber 122. Each reaction chamber 120, as in the case of the reactor 14, is provided with a centrally extending louvered foraminous duct 124, the interiors of which are disposed in communication with manifold pipes 126 for continuously withdrawing the vapors and other gaseous products formed during the pyrolysis reaction. A series of radiant heaters 128 are mounted at vertically spaced intervals along the side walls of the combustion chambers for applying heat to the major walls 130 of the reaction chamber. The exterior of the reactor, as in the case of te reactor 14, is covered by a layer of a thermal insulating material 132 to minimize heat loss.

Still another alternative satisfactory reactor construction is that exemplified by a reactor 134, illustrated in FIGS. 6 and 7. In the embodiment as shown in FIGS. 6 and 7, the reactor is of a generally circular cross section including a circular reaction chamber 136 which is surrounded by an annular combustion chamber 138 provided with a plurality of radiant burners 140 disposed at circumferentially spaced intervals around the ends thereof. The exterior wall of the annular combustion chamber is covered, as in the preceding reactors, with a layer of insulating material 142. A centrally extending foraminous duct 144 is disposed concentrically within the circular reaction chamber 136 and is comprised of a plurality of right truncated conically shaped tubular sections 146 which are secured by a series of radially extending bars 148. The uppermost conical section 146, as best seen in FIG. 6, is connected to a mainfold duct 150, through which the vapors and other gaseous reaction products are removed from the reaction chamber. In accordance with this arrangement, the material to be pyrolyzed enters the reaction chamber and is divided in the form of an annular column which passes downwardly and is heated from the outside toward the inner section in the same manner as previously described in connection with the operational characteristics of the reactor 14 shown in FIGS. 2-4. It will be understood that a plurality of reaction chambers 136 can be incorporated in the same combustion chamber in a manner analogous to that described in connection with FIG. 5.

In its product aspects, the present invention is also directed to the production of an activated char product for use in various commerical and industrial processes including decolorizing, deodorizing, selective adsorption and the like. In addition to the foregoing conventional uses of the activated char product, the use of this material in a finely divided state has been found to impart reinforcing characteristics when used as a filler in various elastomeric or rubber-like formations comparable to that obtained by using the more expensive and well known medium thermal black type filler materials. The reinforcing characteristics of the activated chars produced in accordance with the apparatus and method aspects of the present invention vary depending upon the particular source of the vegetable or carbonaceous feed material which is in part determinative of the carbon content and concentration and/or structure of other materials such as silica, for example, in the resultant charred product. Among the various vegetable feed materials that can be empolyed for making carbon fillers, the carbonized product derived from the pyrolysis reaction of raw rice hulls has been found particularly satisfactory in providing unexpected reinforcing characteristics when used as a filler in various rubber formulations.

The carbonized char derived from the pyrolysis reaction of raw rie hulls consists of an intimate mixture of carbon and silica in which the carbon content broadly ranges from about 50 percent to about 65 percent by weight, while the silica content ranges from about 35 percent to about 50 percent by weight, while other ash constituents, including phosphates, nitrogen compounds, etc., may be present in minor proportions Typically, an activated char produced from raw rice hulls contains 39.4 percent silica with the remainder consisting essentially of carbon.

Under ordinary processing conditions, the activated char product derived from a feed consisting of raw rice hulls is discharged from the ouput end of the reactor in a substantially unbroken condition. The fragile nature of the activated char product enables a simple crushing thereof, whereby all of the particles pass through a 40 mesh screen. In order to effect a further reduction in the particle size of the preliminarily crushed char to within a range in which the carbon/silica product is satisfactory for use as a reinforcing filler in elastomeric compositions, it is necessary to subject the pulverized material to a further grinding or pulverization step, such as schematically illustrated in FIG. 1. Such pulverization operations are carried out to effect a reduction in the size of the carbonized product to below one micron in diameter and preferably within a range of from about 0.5 to about 0.25 micron average particle size. Any one of a variety of commerically available grinding or pulverizing devices can be satisfactorily employed for reducing the char product to an average particle size within the aforementioned range including fluid energy devices and various types of ball mills using metallic or ceramic grinding media. Commercially available vibrating ball mills have been found particularly satisfactory for effecting a reduction in the particle size of the char to within a range of about ¼ to about ½ micron within time periods that are commercially acceptable.

Evaluations were made of the reinforcing characteristics of the gorund carbon/silica product derived from the carbonization of rice hulls relative to the results obtained employing commercially available medium thermal furnace blacks (MT) in various rubber stocks. These tests evidenced that the active carbonized rice hull product imparted essentially the same tensile strength and elongation to styrene-butadiene rubber and neoprene as was obtained employing commerical MT blacks. Typical formulations comprised the use of 100 parts of a nonpigmented styrene-butadiene rubber prepared by hot polymerization (SBR 1006), two parts by weight of a diphenylamine-acetone reaction product as an antioxidant (Aminox), five parts of weight of zince oxide, 1.5 parts by weight of stearic acid as a lubricant to aid processing, five parts by weight of an extending type aromatic hydrocarbon oil (Dutrex), 1.5 parts by weight of an accelerator/activator consisting of 2,2'-benzothiazyl disulfide (MBTS), 0.25 parts tetramethylthiuram disulfide as an ultra accelerator (Methyl Tuads) and two parts by weight of sulfur as a vulcanizing agent. To the foregoing base stock was added varying quantities and types of carbon filler materials. The ativated carbon/silica char produced in accordance with the practice of the present invention was employed in amounts ranging from about 50 parts up to about 150 parts based on 100 parts of the elastomer present. A tensile strength of 1,440 psi and an elongation of 117 percent was obtained on one test specimen containing 100 parts of the activated carbon/silca filler which had been cured at 12 minutes at 307°F. A percentage elongation of another test specimen of 500 percent at a tensile strength of 851 psi was obtained employing 125 parts of this same filler in the same elastomeric base stock. Based on a series of such tests, a filler loading of about 125 parts of the activated carbon/silica per 100 parts of the elastomer component provided the best combination of tensile strength and elongation characteristics.

For comparison purposes, conventional carbon blacks, including a medium thermal furnace black (Sterling MT) and a fast extruding furnace black (Sterling SO FEF), were used in preparing test samples. The tensile strength and percent elongation of cured test samples employing the activated carbon/silica filler material of the present invention compared very favorably with these same physical properties of the same base formulation incorporating similar quantities of more expensive commercially available carbon black filler materials.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. A reactor comprising a substantially upright reaction chamber formed with an inlet through which a carbonaceous feed material is introduced and an outlet through which a carbonized char is discharged, means for heating said chamber around the exterior thereof and for progressively heating the material therein inwardly toward the center of said chamber to effect a progressive carbonization thereof during the course of its travel from said inlet to said outlet, venting means comprising a foraminous duct comprised of a plurality of louvers angularly disposed in a downwardly and outwardly extending direction thereby defining a plurality of slots communicating between said chamber and the interior of said duct, said duct extending substantially centrally of said reaction chamber and for a major portion of the length thereof and said slots disposed at locations along the path of travel of the material for withdrawing the vapors and gaseous products in a direction substantially transversely of the direction of travel of the material as the vapors and gaseous products are formed during the carbonization of the material in the chamber, purging means disposed adjacent to said inlet for introducing a nonoxidizing gas into the interior of said reaction chamber for facilitating the purging of any entrapped air in said feed material and for sweeping said vapors and gaseous products out through said venting means, feed control means for controlling the quantity of feed material entering said inlet, outlet control means for controlling the quantity of carbonized char discharging from said outlet, and cooling means for cooling the carbonized char prior to its discharge from said reactor.

2. The reactor as defined in claim 1, comprising a plurality of reaction chambers disposed in side-by-side substantially parallel relationship within an enclosure incorporating said means for heating said chambers and the material therein.

3. The reactor as defined in claim 1, in which said venting means comprises a foraminous duct disposed substantially centrally of said reaction chamber and which is of a substantially rectangular cross sectional configuration.

4. The reactor as defined in claim 1, wherein said venting means comprises a foraminous duct extending substantially centrally of said reaction chamber and which is of a substantially circular cross sectional configuration.

\* \* \* \* \*

UNITED STATES PATENT OFFICE
CERTIFICATE OF CORRECTION

PATENT NO. : 3,855,071
DATED : Dec. 17, 1974
INVENTOR(S) : Edward Koppelman

It is certified that error appears in the above-identified patent and that said Letters Patent are hereby corrected as shown below:

Col. 2, line 3 after "comparatively", "higer" should be -- higher --;
Col. 4, line 12 before "28", "coller" should be --cooler--; Col. 5, line 45 after "74", "provide" should be --provided--; Col. 6, line 51 before "of", "deviod" should be --devoid--; Col. 8, line 55 after "be", "empolyed" should be --employed--; Col. 8, line 62 after "raw", "rie" should be --rice--; Col. 8, line 68 after "proportions" there should be a period; Col. 9, line 46 before "oxide", "zince" should be --zinc--.

Signed and Sealed this twenty-third Day of September 1975

[SEAL]

Attest:

RUTH C. MASON
Attesting Officer

C. MARSHALL DANN
Commissioner of Patents and Trademarks